United States Patent [19]

Pickelman, Sr. et al.

[11] 4,113,710

[45] Sep. 12, 1978

[54] PROCESS FOR PREPARING SUBSTANTIALLY LINEAR WATER-SOLUBLE INTERPOLYMERIC INTERFACIALLY SPREADING POLYELECTROLYTES

[75] Inventors: Dale M. Pickelman, Sr., Auburn; Ritchie A. Wessling, Midland, both of Mich.

[73] Assignee: The Dow Chemical Company, Midland, Mich.

[21] Appl. No.: 776,167

[22] Filed: Mar. 10, 1977

Related U.S. Application Data

[63] Continuation-in-part of Ser. No. 706,974, Jul. 19, 1976, abandoned.

[51] Int. Cl.$^2$ .......................... C08F 8/34; C08F 8/32; C08F 8/40
[52] U.S. Cl. .............................. 526/30; 260/29.6 TA; 260/29.7 H; 526/27; 526/30; 526/49; 526/50; 526/52.3; 526/273; 526/274; 526/292; 526/293; 526/295; 526/310; 526/312; 526/916

[58] Field of Search .... 260/79.3 MU, 79.7, 29.6 RW; 526/27, 30, 49, 50, 52.3, 292, 295, 273

[56] References Cited

U.S. PATENT DOCUMENTS

| | | | |
|---|---|---|---|
| 3,917,574 | 11/1975 | Gibbs | 260/79.3 MU |
| 3,925,442 | 12/1975 | Samour | 526/312 X |
| 3,965,032 | 6/1976 | Gibbs | 260/79.3 MU |
| 3,998,776 | 12/1976 | Wagener | 260/20.6 SQ |
| 4,002,586 | 1/1977 | Wessling | 260/29.2 EP |

*Primary Examiner*—Christopher A. Henderson, Jr.

[57] ABSTRACT

A process for preparing substantially linear water-soluble interpolymeric interfacially spreading polyelectrolytes, such process comprising (1) a homogeneous polymerization in an aqueous emulsion of a mixture of ethylenically unsaturated nonionic monomers wherein at least one of such monomers contains a reactive group and wherein the polymerization reaction forms an interpolymer containing nonionic functional groups, then (2) adding a coreactant compound to the aqueous emulsion in an amount sufficient to convert the interpolymer to a water-soluble polyelectrolyte having a charge which is the same as the charge of the emulsion of (1) above.

10 Claims, No Drawings

PROCESS FOR PREPARING SUBSTANTIALLY LINEAR WATER-SOLUBLE INTERPOLYMERIC INTERFACIALLY SPREADING POLYELECTROLYTES

CROSS REFERENCE TO RELATED APPLICATION

This is a continuation-in-part application of application Ser. No. 706,974, filed July 19, 1976 (now abandoned).

BACKGROUND OF THE INVENTION

It is known from U.S. Pat. No. 3,917,574, issued Nov. 4, 1975 to Gibbs et al., to make substantially linear water-soluble interpolymeric interfacially spreading polyelectrolytes of the type contemplated herein in a continuous addition solution polymerization process wherein at least one ionic hydrophilic monomer and at least one nonionic hydrophobic monomer in a polar mutual solvent are added to a polymerization reactor at a rate no greater than the rate of polymerization and in a ratio which is substantially equal to that desired in the resulting polymer phase.

It is also known from U.S. Pat. No. 3,965,032, to make such substantially linear interpolymeric interfacially spreading polyelectrolytes by polymerization of a functional nonionic monomeric mixture in a nonaqueous solvent, followed by isolation of the polymer and subsequent conversion to an ionic derivative.

It is often the case when copolymerizing ionic and nonionic monomers that the monomers are not present in the same phase during polymerization and more than one polymerization reaction is occurring. The reaction mixture forms two phases with the ionic monomers preferentially distributed in one phase and the nonionic monomers in the other. Polymerization can take place simultaneously in both phases, forming a complex mixture of highly charged water-soluble polymer and slightly charged essentially nonionic polymer.

Further, only a limited number of solvents are available which can compatibilize nonionic and ionic species and such solvents are usually expensive and difficult to separate from the polymer.

In addition, monomer removal is a problem in purifying these mixtures. For ecological and health reasons, even low levels of monomers are not permissible. Since solution reactions rarely go to high conversion, the unreacted monomer must be separated from the polymer. The simplest way is to strip off the monomers and solvent, then redissolve the polymer in water for subsequent use. But ionic monomers are nonvolatile. Therefore, they must be removed by fractional precipitation extraction or dialysis. And, since in most cases any polymeric surfactant synthesized will be soluble in the same solvents as the monomer, dialysis is the only practical approach.

Added to the above problems are the fact that ionic monomers are often difficult to prepare, purify and store and very often undergo small amounts of homopolymerization wherein the homopolymer cannot be removed from the monomer and ends up as a contaminant in the final product.

Additional related prior art includes U.S. Pat. Nos. 3,178,396 and 3,072,588 which disclose the reaction of a high molecular weight polymer of vinyl benzyl chloride in the form of an anionic latex, with a nucleophile to obtain a water-soluble product. Such processes, however, yield products of very high molecular weight which are contaminated with anionic surfactants, and therefore are not useful as polyelectrolytes as contemplated herein.

SUMMARY

In accordance with the present invention, substantially linear water-soluble interpolymeric interfacially spreading polyelectrolytes of the type as disclosed in U.S. Pat. No. 3,917,574 issued Nov. 4, 1975 and U.S. Pat. No. 3,965,032, issued June 22, 1976, are easily and economically prepared by a process comprising (1) a homogeneous polymerization in aqueous emulsion of a mixture of nonionic monomers wherein at least one of such monomers contains a reactive group and wherein the polymerization reaction forms an interpolymer containing nonionic functional groups, then (2) adding a coreactant compound to the aqueous emulsion in amount sufficient to convert the interpolymer to a water-soluble polyelectrolyte having a charge the same as the charge of the aqueous emulsion of step (1).

It is a further embodiment of the present invention that a stabilizing amount of a polyelectrolyte, of the type as described herein, is used as the surfactant in the preparation of the aqueous emulsion of step (1).

Utilization of the process of the present invention provides an aqueous solution of a polyelectrolyte which is free of undesirable contaminants and which is ready for use. Such material is particularly adapted for use as a surfactant in the preparation of emulsions or dispersions of polymeric materials, such as styrene-butadiene latexes.

DESCRIPTION OF PREFERRED EMBODIMENTS

The polyelectrolytes prepared by the process of the present invention are those compounds described in U.S. Pat. No. 3,917,574, issued Nov. 4, 1975 and U.S. Pat. No. 3,965,032, issued June 22, 1976. More particularly, such materials are composed of a mixture of nonionic hydrophobic units and ionic hydrophilic units wherein the nonionic hydrophobic units are copolymerized ethylenically unsaturated monomers which when in the form of an amorphous homopolymer is less than about 0.1 percent soluble in water and wherein such monomer has no substituent extending more than about 10 Angstrom units from the point of ethylenic unsaturation, the units being randomly distributed in the backbone of the polyelectrolyte. The ionic hydrophilic units are copolymerized ethylenically unsaturated monomers which when in the form of amorphous homopolymers are soluble in water with the ionic hydrophilic units remaining substantially ionized over the pH range of 0 to 14. Further, the polyelectrolyte, when incorporated into a dispersion, is adsorbed at the disperse phase of the dispersion in a substantially flat configuration where the area occupied by each ionic hydrophilic unit of the polyelectrolyte, at the disperse phase surface, is from about 60 to 100 square Angstrom units per ionic hydrophilic unit. Still further, the polyelectrolyte has an adsorption constant equal to or greater than 1 at the point where the disperse phase is saturated with said polyelectrolyte, wherein the adsorption constant is determined as the amount of polyelectrolyte in the disperse phase divided by the amount of polyelectrolyte in the continuous phase.

The preferred interpolymeric interfacially spreading polyelectrolytes (ISPE) as prescribed herein are copolymers of essentially random structure, narrow composition distribution and low molecular weight, i.e., having a number average molecular weight of less than about 100,000 and are water soluble or at least spontaneously dispersible in water to form colloidal solutions. Typically, they are formed by copolymerizing an ionic hydrophilic monomer with a nonionic, relatively hydrophobic monomer in a mutual solvent.

Water would be the preferred solvent for making ISPE's by this method, however, the nonionic monomers are generally not sufficiently water soluble and a modified emulsion polymerization results. The products thus formed are of high molecular weight and have very broad composition distribution. Such polymers do not make good ISPE's.

Further, the above cited disadvantages cannot be overcome merely by using special techniques to control composition such as controlled monomer feed. However, emulsion polymerization offers certain advantages in addition to using water as a polymerization medium: rates of polymerization can be much higher than in a solution process and the viscosity of the reaction mixture remains low even at high polymer concentrations. Therefore, it would be highly desirable to be able to make ISPE's by such process.

The advantages of an emulsion process can be realized by:

1. polymerizing, in aqueous emulsion, a mixture of ethylenically unsaturated nonionic monomers wherein at least one of the monomers contains a reactive group (other than the polymerizing double bond) which reactive group does not intefere with the emulsion polymerization or react rapidly with the polymerization medium, to obtain an aqueous emulsion of interpolymer particles containing nonionic functional groups; then 2. adding to the emulsion of 1), a coreactant compound in sufficient amount to convert the functional interpolymer to a water-soluble polyelectrolyte of like charge to the starting emulsion.

The number of different monomers combined in step (1) to form the reactive interpolymer is not critical to the process provided all are nonionic and at least one contains a reactive functional group as described above. In practice, the number of monomers is normally limited to 4 or 5 with no more than two containing reactive functional groups since there is little advantage in polymer properties to be gained by using more complex mixtures. But this is not a limitation to the process since any number of monomers can be combined as described above. In most cases, a single reactive functional monomer suffices to make an ISPE since its primary purpose is to provide a site on the interpolymer for forming an ionic substituent. But in some cases, a combination is desirable as, for example, when small amounts of very reactive functional group promotes the more rapid conversion of the other in step (2).

The combination of functional monomers must be selected to avoid interfering reactions, e.g. a combination of such monomers should not be selected wherein one monomer yields an anionic site and another monomer a cationic site on the resultant ISPE. Furthermore, a nucleophilic monomer should not be combined with an alkylating monomer.

The polymerization is carried out with a mixture of nonionic monomers thus avoiding the incompatibility problem existing in a mixture containing an ionic component. When all components are compatible and copolymerize to form a water-insoluble polymer, the conditions of classical emulsion polymerization are realized. Polymerization occurs in or on the polymer particles but not in the aqueous phase. Since the polymer particles are the principal loci of polymerization, there are no competing simultaneous polymerization reactions leading to mixtures of products. Instead, random interpolymers of narrow composition distribution can be formed.

If the reactivity ratios are favorable, the emulsion copolymerization can be carried out batch-wise to high conversion. In cases where the reactivity ratios are not favorable, composition drift would result at high conversion. To avoid this and obtain narrow composition distribution, the monomers can be metered into the reaction at the rate at which they are converted to polymer.

The essential ingredients in an emulsion polymerization reaction are monomers which form water-insoluble polymers, emulsifiers and initiators. The choice of ingredients and their proportions in the recipe determine the characteristics of the reaction and the product.

It is important in the present process to carry out the polymerization at the highest possible rates to minimize contact of the reactive functional monomers with the hot aqueous environment. This can be accomplished by combining low organic/aqueous phase ratio, high surfactant level, high initiator level and high temperature. These conditions lead to a fluid latex and very high conversions with short run times. The polymer formed is of low molecular weight and narrow composition distribution. Polymers of low molecular weight, e.g., about 1000 to about 40,000 and preferably <10,000 are especially useful because of their faster kinetics of adsorption. In many applications, such as in emulsion and suspension polymerization, this is very important.

The surfactants are critical to the process. In this regard, such surfactants may be either anionic or cationic depending on the type of ISPE desired. Cationic emulsion polymerization process is preferred for which combinations of a cationic ISPE with a conventional cationic surfactant and sometimes (optionally) nonionic surfactants, may be employed. The preferred combination is a relatively high level of ISPE surfactant, i.e., up to about 12 parts or more based on monomer with from 0 to about 3% of a conventional surfactant. Both species can be selected to have the same cationic structure as desired in the product ISPE. If this is done, the ISPE can be utilized in whatever amount desired because after reaction, it becomes indistinguishable from the product. The ISPE's useful in the present process are described in U.S. Pat. No. 3,965,032. The conventional surfactants include the classes of salts of aliphatic amines, especially the fatty amines, quaternary ammonium salts and hydrates, fatty amides derived from di-substituted diamines, fatty chain derivatives of pyridinium compounds, ethylene oxide condensation products of fatty amines, sulfonium compounds, isothiouronium compounds and phosphonium compounds. Specific examples of cationic surfactants are dodecylamine acetate, dodecylamine hydrochloride, tetradecylamine hydrochloride, hexadecylamine acetate, lauryl dimethylamine citrate, octadecylamine sulfate, dodecylamine lactate, cetyl trimethyl ammonium bromide, cetyl pyridinium chloride, an ethanolated alkyl guanidine amine complex, stearyl dimethyl benzyl ammonium chloride, cetyl dimethyl benzyl ammonium chloride, tetradecylpyridinium bromide, diisobutyl phenoxy ethoxy ethyl dimethyl benzyl ammonium chloride, 1-(2-hydroxyethyl)-2-(mixed pentadecyl and heptadecyl)-2-imidazoline, resin amine ethoxylate, oleyl imidazoline, octadecylethylmethylsulfonium methyl sulfate, dodecyl-bis-β-hydroxyethylsulfonium acetate, dodecylbenzyldimethylsulfonium chloride, dodecylbenzyltrimethylphosphonium chloride, S-p-dodecylbenzyl-N,N,N',N'-tetramethylisothiouronium chloride and the like.

Free radical forming initiators suitable for the preparation of cationic ISPE's include those which form either nonionic or cationic end groups on the polymer chains. The nonionic types such as hydroperoxides and also compounds are preferred, especially hydrogen peroxide, t-butylhydroperoxide (TBHP) and azobisisobutyronitrile. They are employed at high levels, e.g., from about 0.5–5 weight percent and can be added in one shot or introduced continuously into the reaction depending on the reactivity of the initiator. Redox systems which can function in a cationic emulsion polymerization, such as TBHP and hydroxylamine, may also be utilized.

Molecular weight is a complex function of many variables but in this process, it can be controlled by choice of temperature, initiator level and chain transfer agent. Polymerization can be carried out using temperatures of from about 25°–100° C but temperatures of from about 70°–90° C are preferred for most monomers. This results in run times of less than about 12 and usually less than about 5 hours with conversions exceeding about 95%. The selction of chain transfer agent is also important. Most conventional chain transfer agents can be used, with alkyl polyhalides and mercaptans being preferred. Examples are $CHBr_3$, $CCl_4$, $CBr_4$, $CH_3—CH_2—Br$, alkyl mercaptans of 1–12 carbons, thiophenol and hydroxyalkyl mercaptans. Combinations of $H_2O_2$ with $CBr_4$ or mercapto ethanol are especially preferred.

An advantage of the present process is that particle size control is not necessary save only that the latex remain fluid enough to stir. It is also preferred to operate at relatively low solids, e.g., less than about 30% solids and preferably from about 20–25 percent solids. Small particle size, e.g., <2000A is preferred since this allows for faster conversion in step 2, however, any particle size or particle size distribution is acceptable. Even small amounts of coagulum can be tolerated since in step 2, all species are ultimately converted to water-soluble products.

The process of this invention unexpectedly leads to narrow molecular weight distribution at low molecular weights. In fact, the distributions are virtually identical to those obtained in a solution process using the same monomers. By choice of initiator, chain transfer agent, and polymerization conditions, the number average molecular weight can be varied from $10^3$ to $10^5$ with ($\overline{M}_w/\overline{M}_n$ in the range of about 1.5 to 3.

In step 2, the aqueous emulsion of step 1 is converted to an aqueous solution of polyelectrolyte. Any reaction between an added low molecular weight component and the functional groups on the polymer chain that takes place in aqueous media to yield a pH independent site on the polymer chain, can be employed. Exemplary are the class of nucleophilic displacement reactions between an nonionic nucleophile and nonionic alkylating agent to yield an organic cation as illustrated below:

$$RA + Z \rightarrow RZ^+A^-$$

where Z is a nucleophile, RA is the alkylating agent and A is a leaving group. $RZ^+$ is the derived onium cation and $A^-$ its anion formed from the leaving group. Either reactant can be a substituent on the polymer chain and its counterpart coreactant is selected so as to yield a cationic polymeric product. It is, therefore, possible to make the same cationic product from these two different routes.

Nonionic monomers form interpolymers with nucleophilic sites include the general classes of tertiary amines, phosphines and sulfides containing at least one polymerizable double bond as a substituent. Examples include vinyl pyridines, vinylbenzyl dialkyl amines, dialkyl amino alkyl acrylates and methacrylates and alkyl thio alkyl acrylates and methacrylates.

Mixtures of interpolymer latexes with the desired alkylating agent are allowed to react at from ambient temperature to about 100° C, or higher if under pressure, to convert the nucleophilic sites to attached onium ions. As the reaction proceeds, the polymer particles become increasingly hydrophilic and eventually dissolve to form an aqueous solution of the ISPE. After reaction, the reaction product can be used as is or given other treatments such as stripping to remove unreacted alkylating agents.

The alkylating agents are selected to be highly reactive and volatile and must be at least slightly soluble, e.g., >0.001% in order to diffuse through the aqueous phase to the latex particles. Preferred alkylating agents include alkyl bromides of 1–4 carbons, allyl and methallyl chlorides, benzyl chlorides, and dimethyl sulfate.

Preferentially, the alkylating site may be placed on the polymer chain by using an active halogen containing comonomer of the classes: vinyl aralkyl halides, haloalkyl butadienes, bromoalkyl acrylate and methacrylates and vinyl bromide. Preferred are vinylbenzyl chloride, chloromethylbutadiene and the bromoalkyl esters. Latexes containing these species in copolymerized form are reacted with carbon-containing nucleophiles which are stable in and can diffuse through aqueous media having a hetero atom as the center of nucleophilicity wherein each covalent bond of said hetero atom is to a carbon atom.

The nucleophilic compounds which are used advantageously in the practice of this invention are represented by the following classes of compounds, sometimes called Lewis bases:

(a) monobasic aromatic nitrogen compounds;
(b) tetra (lower alkyl)thioureas;
(c) $R_1$-S-$R_2$ wherein $R_1$ and $R_2$ individually are lower alkyl, hydroxy lower alkyl or wherein $R_1$ and $R_2$ are combined as one alkylene radical having 3 to 5 carbon atoms;

wherein $R_2$ and $R_3$ individually are lower alkyl or hydroxy lower alkyl, or are combined as one alkylene radical having 3 to 5 carbon atoms and $R_1$ is lower alkyl, aralkyl or aryl except when $R_2$ and $R_3$ together are an alkylene radical then $R_1$ is lower alkyl or hydroxy lower alkyl; and

wherein $R_1$, $R_2$ and $R_3$ individually are lower alkyl, hydroxy lower alkyl or aryl.

In this specification the term lower alkyl means an alkyl having from 1 to 4 carbon atoms such as methyl, ethyl, propyl, isopropyl, n-butyl and isobutyl.

Representative specific nucleophilic compounds are pyridine, quinoline, isoquinoline, tetramethyl thiourea, tetraethyl thiourea, hydroxyethylmethyl sulfide, hydroxyethylethyl sulfide, dimethyl sulfide, diethyl sulfide, di-n-propyl sulfide, methyl-n-propyl sulfide, methylbutyl sulfide, dibutyl sulfide, dihydroxyethyl sulfide, bis-hydroxybutyl sulfide, trimethylene sulfide, thiacyclohexane, tetrahydrothiophene, N-methylpiperidine, N-ethylpyrrolidine, N-hydroxyethylpyrrolidine, trimethylphosphine, triethylphosphine, tri-n-butylphosphine, triphenylphosphine, trimethylamine, triethylamine, tri-n-propylamine, tri-isobutylamine, hydroxyethyldimethylamine, butyldimethylamine, trihydroxyethylamine, and N,N,N-dimethylphenethylamine. Use of the nucleophilic component as the reactant is the preferred route because the monomer containing alkylating sites are less likely to interfere with emulsion polymerization and the coreactant nucleophiles are more water soluble and blend more readily into the latex. They are also easier to remove in a post reaction cleanup amd are less toxic than coreactant alkylating agents.

Another general class of reactions suitable for the present process are the reactions of epoxides with nucleophiles and acids as shown below:

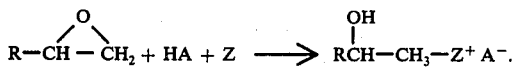

As described earlier, either the epoxide or the nucleophile may be attached to the polymer chain. Epoxide groups can be incorporated into the copolymer by copolymerization of an unsaturated epoxide such as glycidyl acrylate or methacrylate. Alternatively, the nucleophilic polymers described earlier can be reacted with a lower epoxide such as ethylene oxide, propylene oxide, glycidyl ethers and the like. Suitable acids for either case include HCl, $H_2SO_4$, and lower carboxylic acids, and are selected on the basis of the anion desired.

In the preparation of anionic ISPE's anionic emulsion polymerization is required. For such process, anionic ISPE's can be used with conventional anionic soaps known in the art and initiators which yield nonionic or anionic end groups. Any reaction can be used in step 2 which converts a functional copolymer in aqueous emulsion to a water-soluble anionic polyelectrolyte. For example, an anionic latex of a vinyl benzyl chloride coopolymer can be formed and then post reacted with sulfite ion to yield a vinyl benzyl sulfonate anionic polyelectrolyte.

The following nonlimiting examples, wherein all parts and percentages are by weight, will serve to illustrate the present invention:

EXAMPLE 1

A series of functional monomers were copolymerized in emulsion. The reaction ingredients and conditions are set forth on the following Table I. The continuous addition polymerization reaction of step 1 was conducted by metering the designated monomers along with an aqueous stream containing cationic polymeric surfactant, $H_2O_2$ and $FeCl_3 \cdot 6H_2O$ into a polymerization reactor over a one-hour period, followed by heating the admixture for an addtional one hour at the designated temperature. The remaining reactions were conducted using a batch polymerization technique. In each instance a water-soluble, essentially contaminant-free ISPE of indicated composition was obtained using the ingredients and conditions as specifically set forth in step 2 of Table I.

TABLE I

| | Experiment No. | | | |
|---|---|---|---|---|
| | 1 | 2 | 3 | 4 |
| Step 1 | | | | |
| Emulsion Polymerization: | (Enough to make 25% max. solids) | | | |
| Water (Deionized) | | | | |
| Polymeric Surfactant[1] | 5.0 | 10.0 | 10.0 | 5.0 |
| Cationic Soap[2] | — | 1.0 | 1.0 | — |
| $H_2O_2$ | 2.25 | 2.25 | 2.25 | 2.25 |
| $FeCl_3 \cdot 6H_2O$ | 0.005 | 0.005 | 0.005 | 0.005 |
| Methyl Methacrylate | 48.0 | 36.6 | 66.0 | 60.0 |
| Glycidyl Methacrylate | 52.0 | — | — | — |
| Bromoethyl Methacrylate | — | 63.4 | — | — |
| Chloromethyl Butadiene | — | — | 34.0 | — |
| 4-Vinyl Pyridine | — | — | — | 40.0 |
| 1-Dodecanethiol | — | 0.25 | 0.25 | — |
| Carbon Tetrabromide | — | — | — | 1.0 |
| Polymerization Method | Continuous Addition | Batch | Batch | Batch |
| Time (hrs)/Temp. (° C) | 2/80 | 2/80 | 2/80 | 1/80 |
| Step 2 | | | | |
| Polyelectrolyte Preparation: Wt. of latex ≡ 25 g copolymer | 105 | 111 | 111 | 110 |
| Wt. of Water | 115 | 111 | 111 | 110 |
| Wt. of Dimethylsulfide (2.5/1) Stoichiometry | 14.2 | — | 12.9 | — |
| Wt. of Acetic Acid (1/1) | 5.5 | — | — | — |
| Wt. of 25% Trimethyl Amine (1.1/1) | — | 21.4 | — | — |
| Wt. of Methyl Bromide | — | — | — | 9.0 |
| Time (hrs)/Temp (° C) | 16/50 | 16/50 | 16/50 | 72/25 |
| Charge density[3] | — | 0.286 | 0.285 | 0.408 |
| Activity; Material Balance[4] | 0.138 | 0.134 | 0.146 | 0.164 |
| Activity; Titiration Analysis[4] | — | 0.107 | 0.127 | 0.149 |

[1]Cationic ISPE, as per USP 3,965,032 composed of copolymer of 3 moles of methyl methacrylate and 2 moles of vinyl benzyl dimethyl sulfonium chloride.
[2]Dodecylbenzyl dimethyl sulfonium chloride.
[3]Meq. of onium Meg. solution.
[4]Grams polyelectrolyte per gram solution.

EXAMPLE 2

A series of emuslion polymerization reactions were carried out by batch polymerization as per Runs 2 through 4 of Example 1, using a mixture of 60 mole percent methylmethacrylate, 40 mole percent vinyl benzyl chloride, varying amount of the polymerization initiator $H_2O_2$, varying amounts and types of chain transfer agents, about 7 weight percent of a preformed cationic ISPE (as per U.S. Pat. No. 3,965,032) composed of 3 moles of methyl methacrylate and 2 moles of vinyl benzyl dimethyl sulfonium chloride, and about 0.5 weight percent of the conventional soap dodecylbenzyl dimethyl sulfonium chloride. The following Table II sets forth the compositions used as well as the molecular weight of the products formed.

TABLE II

| Run No. | Mole % Based on Monomers | | | | $\overline{M}w \times (10^3)$ | $\overline{M}n \times (10^3)$ | $\overline{M}w/\overline{M}n$ |
|---|---|---|---|---|---|---|---|
| | MMA | VBC | $H_2O_2$ | $CBr_4$ | DT | | | |
| 5 | 60 | 40 | 8 | — | — | 69.8 | 26.7 | 2.61 |
| 6 | 60 | 40 | 6.68 | — | 0.15 | 43 | 18.2 | 2.36 |
| 7 | 60 | 40 | 6.68 | — | 0.6 | 35.3 | 14.8 | 2.39 |
| 8 | 60 | 40 | 1.62 | 0.81 | — | 25.5 | 9.9 | 2.55 |
| 9 | 60 | 40 | 3.15 | 1.58 | — | 14.3 | 5.6 | 2.56 |

TABLE II-continued

| Run No. | MMA | VBC | Mole % Based on Monomers H₂O₂ | CBr₄ | DT | $\overline{M}w$ × (10³) | $\overline{M}n$ × (10³) | $\overline{M}w/\overline{M}n$ |
|---|---|---|---|---|---|---|---|---|
| 10 | 60 | 40 | 6 | 3 | — | 8 | 3.6 | 2.23 |

MMA - Methylmethacrylate
VBC - Vinylbenzyl chloride
H₂O₂ - Hydrogen peroxide
CBr₄ - Carbon tetrabromide
DT⁴ - Dodecanethiol

EXAMPLE 3

Multicomponent interpolymers were prepared in a batch process as in Example 2 usng same ISPE as surfactant.

TABLE III

| Data Reference 120-C-0058 | (4A) 3 Components | (9A)⁽¹⁾ 2 Reactive Monomers | | |
|---|---|---|---|---|
| Emulsion Polymerization: | | | | |
| (Batch) | | | | |
| DI Water | (Enough to make 25% max. solids) | | | |
| Polymeric surfactant⁽²⁾ | 12.0 | 12.0 | | |
| H₂O₂ | 2.70 | 2.43 | | |
| FeCl₃ . 6H₂O | 0.0060 | 0.0054 | | |
| Acrylonitrile | 20.0 | 11.9 | | |
| Methyl Methacrylate | — | 22.3 | | |
| Styrene | 30.0 | — | | |
| Glycidyl Methacrylate | — | 31.7 | | |
| Vinylbenzyl Chloride | 50.0 | 34.1 | | |
| HSCH₂CH₂OH | 3.88 | 3.49 | | |
| Time (hrs.)/Temp. (° C) | 1/75 | 1/75 | | |
| Polyelectrolyte Preparation: | (4B) | (4C) | (9B) | (9C) |
| Wt. Latex | 224 | 224 | 220 | 220 |
| Wt. DI Water | 112 | 112 | 110 | 110 |
| Wt. N,N-Dimethylethanolamine | 14.6 | — | 19.8 | — |
| Wt. Dimethylsulfide | — | 10.0 | — | 13.8 |
| Wt. Acetic Acid | — | 6.7 | — | 6.7 |
| Time (hrs.)/Temp. (° C) | 0.5/70 | 1.5/50 | 0.5/70 | 1/50 |
| Activity (1.0 = 100%) | | | | |
| Material Balance | 0.201 | 0.191 | 0.210 | 0.196 |
| Gravimetric Analysis | 0.220 | 0.186 | 0.255 | 0.226 |
| Titration Analysis | 0.180 | 0.171 | 0.196 | 0.182 |

⁽¹⁾Equal mole concentration of each monomer.
⁽²⁾Cationic ISPE, as per USP 3,965,032 composed of copolymer containing 3 moles methylmethacrylate/2 moles vinylbenzyl chloride.

Each of the above reaction products were easily converted to water-soluble, essentially contaminant free, ISPE's by reaction as set forth in step 2 of Table I, Example 1.

Further, the products of the emulsion reaction, as set forth in Table II above, were found to have essentially equivalent molecular weight values as materials produced by a solution polymerization technique. More particularly, such solution polymerization comprised preparing a mixture containing methyl ethyl ketone and a monomer mixture comprising 60 mole percent methyl methacrylate and 40 mole percent vinyl benzyl chloride, along with 1.7 mole percent (based on monomer) of the polymerization initiator azobisbutyronitrile and from 0.36 to 3.64 mole percent (based on monomer) of carbon tetrabromide as a chain transfer agent. Such mixture was then metered, over a perid of one hour, into a reactor containing additional methyl ethyl ketone. The final mixture was then refluxed for a period of five hours.

It was unexpected that materials having sufficiently low molecular weight to be useful as surfactants could be prepared by an emulsion polymerization process. Further, it was unexpected that such process would provide a means of obtaining products having a narrow molecular weight distribution, such as is normally obtained only by using solution polymerization techniques. More particularly, molecular weights obtained by emulsion polymerization are affected by the same variables as in any free radical process. For example, increases in initiator concentration and temperature as well as the use of chain transfer agents normally decrease the molecular weight of the reaction product. However, such result is often accompanied by a broadening of the molecular weight distribution due to the generation of a fraction of low molecular weight material resulting from primary termination reactions. In contrast to these expectations, the process of the present invention provides polymers having molecular weights as low as can be obtained by solution polymerization and with comparable molecular weight distribution.

What is claimed is:

1. A process for preparing a substantially linear water-soluble interpolymeric interfacially spreading polyelectrolyte in the absence of oppositely charged surfactants wherein:

(A) said polyelectrolyte is composed of a mixture of nonionic hydrophobic units and ionic hydrophilic units wherein said nonionic hydrophobic units are copolymerized ethylenically unsaturated monomers which when in the form of an amorphous homopolymer is less than about 0.1 percent soluble in water and wherein said monomer has no substituent extending more than about 10 Angstrom units from the point of ethylenic unsaturation said units being randomly distributed in the backbone of said polyelectrolyte and wherein said ionic hydrophilic units are copolymerized ethylenically unsaturated monomers which when in the form of amorphous homopolymers are soluble in water and wherein said ionic hydrophilic units remain substantially ionized over a pH range of 0 to 14; and (B) said polyelectrolyte when incorporated into a dispersion is adsorbed at the disperse phase of said dispersion in a substantially flat configuration and where the area occupied by each ionic hydrophilic unit of said polyelectrolyte at the disperse phase surface is from about 60 to 100 square Angstrom units per ionic hydrophilic unit, and wherein said polyelectrolyte has an adsorption constant equal to or greater than 1 at the point where the disperse phase is saturated with said polyelectrolyte wherein said adsorption constant is determined as the amount of polyelectrolyte in the disperse phase divided by the amount of polyelectrolyte in the continuous phase;

said process comprising (1) the homogeneous polymerization in an aqueous emulsion containing a surfactant and a polymerization initiator of a mixture of ethylenically unsaturated nonionic monomers which monomers form water-insoluble copolymers and wherein at least one of said monomers contains a reactive group to form an interpolymer containing nonionic functional groups, then (2) adding a coreactant compound to said aqueous emulsion in an amount sufficient to convert said interpolymer to a water-soluble polyelectrolyte said polyelectrolyte having a charge which is the same as the charge of the emulsion of (1) above.

2. The process of claim 1 wherein said interpolymeric interfacially spreading polyelectrolyte is a water-soluble cationic compound.

3. The process of claim 2 wherein a stabilizing amount of said cationic interfacially spreading polyelectrolyte is used as the surfactant for the preparation of said aqueous emulsion.

4. The process of claim 3 wherein said cationic interfacially spreading polyelectrolyte used as the surfactant for the preparation of said aqueous emulsion is prepared by a process comprising (1) the homogeneous polymerization in an aqueous emulsion of a mixture of ethylenically unsaturated nonionic monomers wherein at least one of said monomers contains a reactive group to form an interpolymer containing nonionic functional groups, then (2) adding a coreactant compound to said aqueous emulsion in an amount sufficient to convert said interpolymer to a water-soluble polyelectrolyte said polyelectrolyte having a charge which is the same as the charge of the emulsion of (1) above.

5. The process of claim 2 wherein said polyelectrolyte is the reaction product of methyl methacrylate, vinylbenzyl chloride and dimethyl sulfide.

6. The process of claim 2 wherein said polyelectrolyte is the reaction product of methyl methacrylate, glycidyl methacrylate, dimethyl sulfide and acetic acid.

7. The process of claim 2 wherein said polyelectrolyte is the reaction product of methyl methacrylate, bromoethyl methacrylate and trimethyl amine.

8. The process of claim 2 wherein said polyelectrolyte is the reaction product of methyl methacrylate, chloromethyl butadiene and dimethyl sulfide.

9. The process of claim 2 wherein said polyelectrolyte is the reaction product of methyl methacrylate, 4-vinyl pyridine and methyl bromide.

10. The process of claim 2 wherein said polyelectrolyte is the reaction product of styrene, acrylonitrile, vinyl benzyl chloride and N,N-dimethylethanolamine.

* * * * *